(12) United States Patent
Iannucci et al.

(10) Patent No.: US 8,239,870 B2
(45) Date of Patent: Aug. 7, 2012

(54) SCHEDULING EXECUTION OF WORK UNITS WITH POLICY BASED EXTENSION OF LONG-TERM PLAN

(75) Inventors: Pietro Iannucci, Rome (IT); Franco Mossotto, Rome (IT); Liliana Francesca Pasceri, Guidonia (EP)

(73) Assignee: International Business Machines Corporation, Armonk, NY (US)

( * ) Notice: Subject to any disclaimer, the term of this patent is extended or adjusted under 35 U.S.C. 154(b) by 1515 days.

(21) Appl. No.: 11/692,413

(22) Filed: Mar. 28, 2007

(65) Prior Publication Data

US 2007/0234361 A1    Oct. 4, 2007

(30) Foreign Application Priority Data

Mar. 29, 2006    (EP) .................................. 06111868

(51) Int. Cl.
  *G06F 9/46*       (2006.01)
  *G06F 19/00*    (2011.01)
  *G06Q 10/00*    (2012.01)
(52) U.S. Cl. ....... 718/102; 700/100; 705/7.12; 705/7.21
(58) Field of Classification Search .................. None
  See application file for complete search history.

(56) References Cited

U.S. PATENT DOCUMENTS

| 6,032,121 | A | * | 2/2000 | Dietrich et al. | ............... | 705/7.22 |
| 6,135,396 | A | * | 10/2000 | Whitfield et al. | ......... | 246/182 R |
| 6,167,380 | A | * | 12/2000 | Kennedy et al. | ............. | 705/7.31 |
| 6,434,440 | B1 | * | 8/2002 | Teranishi et al. | ............... | 700/97 |
| 6,944,862 | B2 | * | 9/2005 | Caggese et al. | ............... | 718/102 |
| 7,711,613 | B2 | * | 5/2010 | Ogawa et al. | .................... | 705/28 |
| 2002/0065692 | A1 | * | 5/2002 | Nishimoto et al. | ............... | 705/7 |
| 2005/0076043 | A1 | * | 4/2005 | Benedetti et al. | ............. | 707/100 |
| 2007/0147264 | A1 | * | 6/2007 | Zolfaghari et al. | ........... | 370/252 |
| 2007/0244777 | A1 | * | 10/2007 | Torre et al. | ...................... | 705/35 |
| 2009/0327037 | A1 | * | 12/2009 | Ng et al. | ......................... | 705/10 |

OTHER PUBLICATIONS

End-to-End Scheduling with IBM Tivoli Workloadkload Scheduler V 8.2; IBM Redbooks; Sep. 2004.*

* cited by examiner

*Primary Examiner* — Thomas Lee
*Assistant Examiner* — Abdullah Al Kawsar
(74) *Attorney, Agent, or Firm* — Yee & Associates, P.C.; Jeffrey S. LaBaw

(57) ABSTRACT

A solution for scheduling execution of jobs is proposed. In this case, a long-term plan expressed in terms of streams of jobs is created in advance (for example, for some months). An actual production plan (for a production period P(p) typically of one day) is then generated by extracting a corresponding portion of the long-term plan and expanding the streams into their jobs. In the proposed solution, a policy for the long-term plan is defined; for example, this policy specifies a minimum length L(min) and a maximum length L(max) of the long-term plan. The (remaining) length of the long-term plan is checked after each generation of the production plan; if the long-term plan is shorter than the minimum length L (min), it is expanded automatically up to the maximum length L(max).

18 Claims, 5 Drawing Sheets

SCHEDULING EXECUTION OF WORK UNITS WITH POLICY BASED EXTENSION OF LONG-TERM PLAN

FIELD OF THE INVENTION

The present invention relates to the information technology field. More specifically, the invention relates to the scheduling of work units in a data processing system.

BACKGROUND ART

Scheduling of different work units (for example, batch jobs) is a commonplace activity in data processing systems. For this purpose, workload schedulers have been proposed in the last years to automate the submission of large quantities of jobs from a central point of control; an example of commercial scheduler is the "IBM Tivoli Workload Scheduler (TWS)" by IBM Corporation.

Typically, the scheduler controls the submission of the jobs for their execution according to a specific plan. The plan defines the flow of execution of the jobs to be submitted in a production period (such as one day); particularly, the plan orders the execution of the jobs according to their dependencies (for example, based on constraints defined by the completion of other jobs or the availability of required resources of the system).

The generation of the plan is a very complex and time-consuming activity (which requires the addition and the removal of thousands of jobs). Therefore, this operation may have a detrimental impact on the workload of the system (taking into account that it must be repeated every day for lie next production period).

A solution known in the art for mitigating the above-mentioned problem is of creating a preliminary long-term plan in advance. For example, the long-term plan may be expressed in terms of streams of jobs (each one including multiple jobs treated as a single work unit); in this case, the long-term plan simply orders the execution of the streams according to their sequence dependencies (disregarding any other constraints). As a result, the complexity of the task is strongly reduced, so that the long-term plan can span over a very long period (for example, some months). Moreover, the operation is typically executed with a low frequency (for example, only when a few days remain in the future), so that it does not significantly impair the performance of the system.

On the other hand, the actual (production) plan is generated by extracting the portion of the long-term plan corresponding to the relevant production period; the streams are then expanded into the corresponding jobs, and the remaining dependencies are resolved. In this way, the time required to generate the production plan is strongly reduced.

However, the above-described solution is not completely satisfactory. Particularly, this technique requires the maintenance of two plans (i.e., the long-term plan and the production plan); this adversely affects the management of the scheduling environment.

Moreover, whenever the dependencies among the streams are changed, the corresponding execution flow in the long-term plan may be invalidated. Therefore, it is necessary to identify the streams affected by the changes in the long-term plan, and then redefine their order of execution. However, this further increases the complexity of the task of managing the long-term plan.

All of the above has a detrimental impact on the activity of planning the execution of the jobs. Particularly, the above-mentioned side effects may defeat the advantages provided by the availability of the long-term plan (for the generation of the production plan).

SUMMARY OF THE INVENTION

In its general form, the present invention is based on the idea of updating the long-term plan automatically.

Particularly, the present invention provides a solution as set out in the independent claims. Advantageous embodiments of the invention are described in the dependent claims.

More in detail, an aspect of the invention proposes a method for scheduling execution of work units (such as jobs) in a data processing system. The method involves generating a preliminary (or long-term) plan of execution of the work units for a long-term period. A production plan of execution of the work units is then generated for a production period, which is included in the long-term period; the production plan is generated from a portion of the auxiliary plan corresponding to the production period. The method continues by submitting the work units for execution according to the production plan. The method also involves the step of monitoring compliance of the preliminary plan with a predetermined policy. The preliminary plan is then updated to comply with said policy.

In an embodiment of the invention, this involves extending the long-term plan to a predefined minimum length (at least equal to the production period).

As a further enhancement, the production plan is extended up to a predefined maximum length.

Preferably, the operation is performed after each generation of the production plan.

A way to further improve the solution is of updating the long-term plan in response to any change to rules, which define execution dependencies of the jobs used to generate the long-term plan.

Preferably, this operation is performed before each generation of the production plan.

In an embodiment of the invention, the maximum length of the long-term plan is set according to an estimated changing rate of the above-mentioned rules.

Typically, the long-term plan is defined in terms of streams of jobs; in this case, the production plan is generated by extracting the portion of the long-term plan corresponding to the production period, and then expanding each stream into the corresponding jobs.

Another aspect of the invention proposes a computer program for performing the method.

A further aspect of the invention proposes a corresponding system.

REFERENCE TO THE DRAWINGS

The invention itself, as well as further features and the advantages thereof, will be best understood with reference to the following detailed description, given purely by way of a nonrestrictive indication, to be read in conjunction with the accompanying drawings, in which.

DETAILED DESCRIPTION

Figure 1:
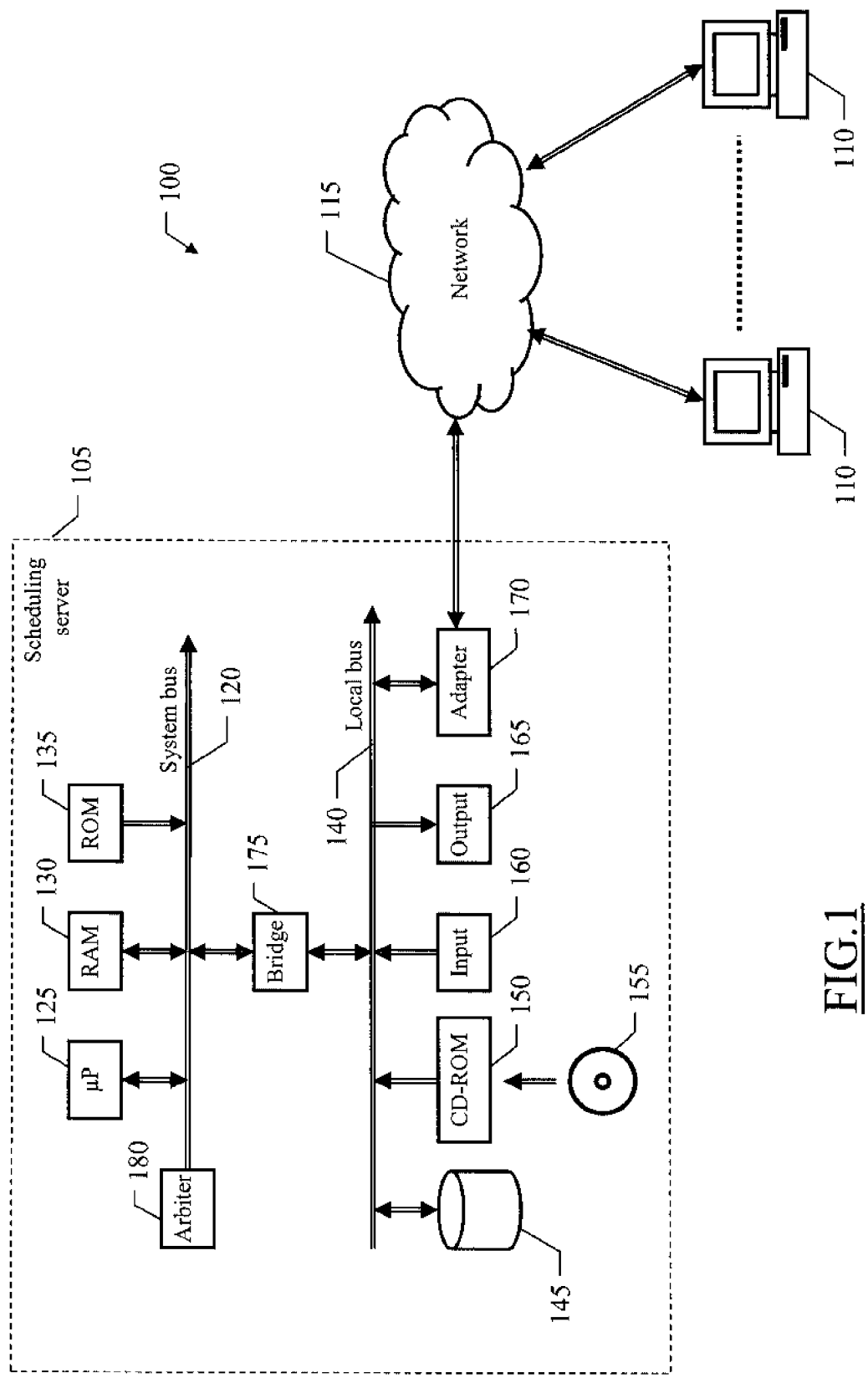
FIG. 1 is a schematic block diagram of a data processing system in which the solution according to an embodiment of the invention is applicable.

With reference in particular to FIG. 1, a data processing system 100 with distributed architecture is illustrated. The system 100 includes a central scheduling server 105, which is used to automates monitor and control the execution of work units in the system 100. Typically, the work units consist of non-interactive jobs (for example, payroll programs, cost analysis applications, and the like), which are to be executed on a set of workstations 110. For this purpose, the scheduling server 105 and the workstations 110 communicate through a network 115 (for example, Internet-based).

More specifically, the scheduling server 105 is formed by several units that are connected in parallel to a system bus 120. In detail, multiple microprocessors (μP) 125 control operation of the scheduling server 105; a RAM 130 is directly used as a working memory by the microprocessors 125, and a ROM 135 stores basic code for a bootstrap of the scheduling server 105. Several peripheral units are clustered around a local bus 140 (by means of respective interfaces). Particularly, a mass storage consists of one or more hard-disks 145 and a drive 150 for reading CD-ROMs 155. Moreover, the scheduling server 105 includes input units 160 (for example, a keyboard and a mouse), and output units 165 (for example, a monitor and a printer). An adapter 170 is used to connect the scheduling server 105 to the network 115. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

Figure 2:
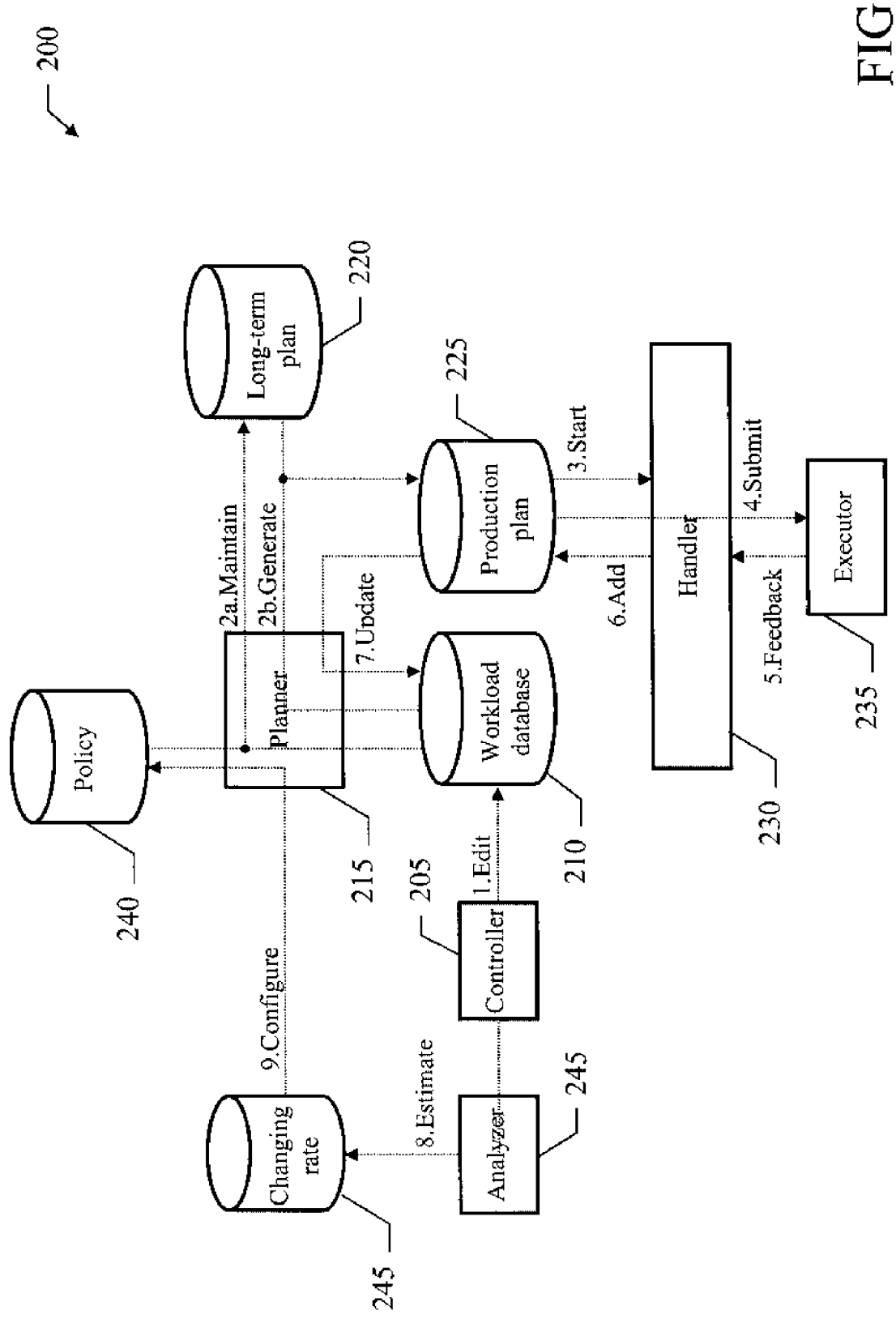
FIG. 2 is a collaboration diagram representing the roles of different software modules implementing the solution according to an embodiment of the invention.

Moving to FIG. 2, the main software modules that run on the scheduling server are illustrated. The information (programs and data) is typically stored on the hard-disk and loaded (at least partially) into the working memory of the scheduling server when the programs are running. The programs are initially installed onto the hard disk, for example, from CD-ROM. Particularly, the figure describes the static structure of the system (by means of the corresponding modules) and its dynamic behavior (by means of a series of exchanged messages, which are denoted with progressive sequence numbers).

More in detail, the scheduling server runs a corresponding application 200 (for example, the above-mentioned "TWS"). The scheduler 200 includes a controller 205 (such as the "Composer"program in the case of the "TWS"), which is used to edit a workload database 210 (action 1).

The workload database 210 contains the definition of the whole scheduling environment. Particularly, the workload database 210 stores a representation of the topology of the system (i.e., the workstations with their connections) and of the hardware/software resources that are available for the execution of the jobs. The workload database 210 also includes a descriptor of each job, which defines rules controlling its execution (written in a suitable control language, for example, XML-based). More specifically, the job descriptor specifies the programs to be invoked, their arguments and environmental variables. The execution of the job is typically conditioned by a set of dependencies (which must be met before the job can start); exemplary dependencies are time constraints (such as a specific day, an earliest time or a latest time for its execution, or a maximum allowable duration), sequence constraints (such as the successful completion of other jobs), or enabling constraints (such as the entering of a response to a prompt by an operator). The job descriptor also specifies the (physical or logical) resources that are required by the job; those resources can be seen as a particular type of dependency, which conditions the execution of the job to their availability. At the end, the job descriptor includes statistics information relating to the previous executions of the job (such as a log of their duration from which a corresponding estimated duration of the next executions may be inferred).

Generally, the jobs are organized into streams; each stream consists of an ordered sequence of jobs, which must be run as a single work unit respecting predefined dependencies (for example, jobs to be executed on the same day or using common resources). A descriptor is likewise associated with each stream. In this case, the stream descriptor indicates the corresponding jobs forming the stream, with the (internal) sequence dependencies among the jobs. Moreover, the stream descriptor indicates a run-cycle of the stream, which specifies when its jobs should be executed (for example, every day, week or month). The stream descriptor also includes any (external) dependencies of the stream as a whole (i.e., time constraints, sequence constraints on other jobs or streams, enabling constraints, and/or resource constraints). At the end, the stream descriptor includes statistics information (of the previous executions of the stream as a whole), which is used to estimate the duration of the next executions of the same stream.

A planner 215 (such as the "Master Domain Manager" of the "TWS") maintains a long-term plan (LTP) 220, which defines a (preliminary) flow of execution of the streams over a predefined long-term period P(lt), such as several months (action 2a). For this purpose, the planner 215 adds multiple instances of each stream according to its run-cycle (for example, one every day, week or month); the planner 215 then orders the execution of the different instances of the streams so as to resolve their external dependencies based on the time and sequence constraints (as defined in the workload database 210). Therefore, the information required to create the long-term plan 220 is minimal, since neither the internal sequence dependencies of the streams (among their jobs) nor other external dependencies (based on the resource constraints) are taken into account.

The planner 215 also generates a production plan 225 (action 2b), which defines an actual flow of execution of the jobs over a predefined production period P(p) (typically, one day). For this purpose, the planner 215 extracts the portion of the long term plan 220 corresponding to the production period P(p); the planner 215 then expands the streams into the corresponding jobs, and orders their execution so as to resolve the remaining dependencies defined in the workload database 210 (i.e., the internal sequence dependencies among the jobs of each stream and the external dependencies based on the resource constraints). The production plan 225 is generated automatically before every production period (and it is then stored, for example, in the "Symphony" file for the "TWS"). Typically, the planner 215 updates the production plan 22S by adding the jobs so obtained (for the next production period) and by removing the preexisting jobs (of the previous production period) that have been completed; in addition, the jobs of the previous production period that did not complete successfully or that are still running or waiting to be run can be maintained in the production plan 225 (for their execution during the next production period).

A handler 230 (such as the "Batchman" process in the "TWS") starts the production plan 225 at the beginning of every production period, for example, at 6:00 AM (action 3). Whenever a new job of the production plan 225 must be executed, the handler 230 submits it to an executor 235, such as the "Jobman" process in the "TWS" (action 4). The executor 235 directly controls the launching and the tracking of the job (for example, interfacing with corresponding agents running on the different workstations). The executor 23S returns feedback information about the execution of the job to the handler 230 (action 5); for example, the feedback information indicates whether the job has been completed successfully, its actual duration, and the like. The handler 225 adds this information to the production plan 225 (action 6), so as to have a real-time picture of the current state of all the jobs of the production plan. At the end of the production period, the planner 215 updates the statistics information relating to the executed jobs in the workload database 210, according to the content of the production plan 225 (action 7).

In the solution according to an embodiment of the present invention, the long-term plan 220 is extended according to a predefined policy 240 defining its length. For this purpose, the planner 215 monitors compliance of the long-term plan 220 with the policy 240; the planner 215 then updates the long-term plan 220 automatically to maintain it compliant with the policy 240.

The proposed solution avoids (or at least reduces) the activities required to maintain the long-term plan 220; this has a beneficial impact on the management of the scheduling environment.

Therefore, the task of planning the execution of the jobs is strongly facilitated. Particularly, this solution allows exploiting the advantages provided by the long-term plan 220 (for the generation of the production plan 225), without the side effects of the prior art described in the foregoing.

Preferably, the policy 240 defines a minimum length L(min) of the long-term plan 220. The minimum length L(min) is at least equal to the production period P(p). This ensures that the long-term plan 220 is always maintained long enough to extract a portion necessary for the generation of a new production plan 225.

Moreover, in an embodiment of the invention the policy 240 also defines a maximum length L(max) of the long-term plan 220 (longer than its minimum length L(min)). The maximum length L(max) is set according to the storage space that can be used on the scheduling server for the long-term plan 220. Moreover, it is also possible to tune the maximum length L(max) according to the changing rate of the external sequence dependencies for the streams in the workload database 210. Indeed, any change to the external sequence dependencies invalidates the execution flow of the instances of the affected streams already inserted in the long-term plan 220 (so that their execution must be redefined accordingly). Therefore, the maximum length L(max) of the long-term plan 220 is a tradeoff between the opposed requirements of reducing the frequency of its extensions (high values) and of its redefinition (low values). Particularly, it is preferable to reduce the length of the long-term plan 220 in a dynamic environment (wherein the external sequence dependencies are changed frequently), whereas it is preferable to increase the length of the long-term plan 220 in a steady environment (wherein the external sequence dependencies are changed rarely).

For this purpose, the scheduler 200 also includes an analyzer 245 that interfaces with the controller 205. The analyzer 245 monitors the changes to the external sequence dependencies for the streams in the workload database 210; in this way, the analyzer 245 can estimate their changing rate, which is stored into a corresponding table 250 (actions 8); for example, the operation is based on a running average of the time elapsed between each pair of consecutive changes to the external sequence dependencies. The planner 215 then configures the maximum length L(max) of the policy 240 accordingly (action 9); typically, the maximum length L(max) is calculated as a function of the (estimated) changing rate 250 (for example, equal to a predefined multiple of its inverse, such as 10-20, up to a maximum allowable value).

Figure 3A:
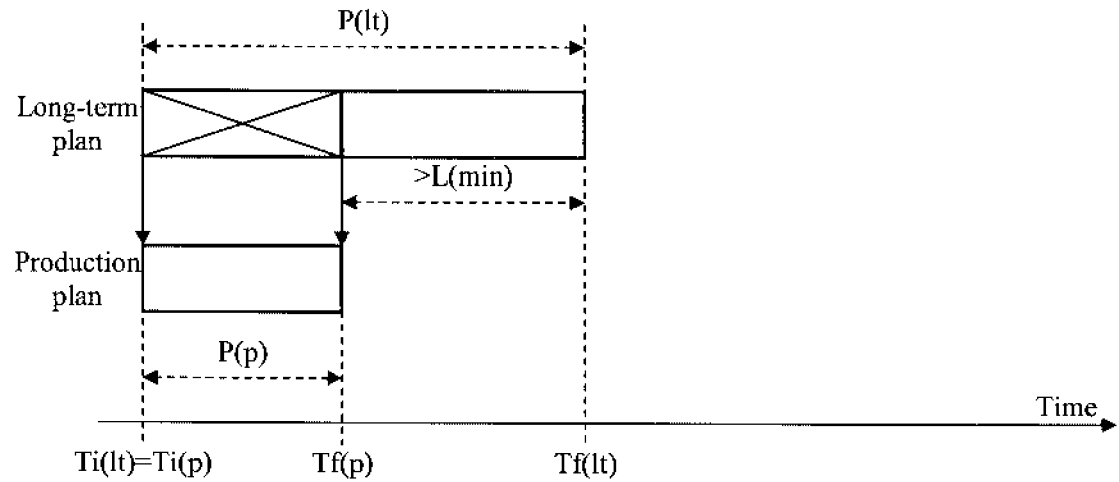
FIGS. 3a-3b illustrate exemplary applications of the solution according to an embodiment of the invention.
Figure 3B:
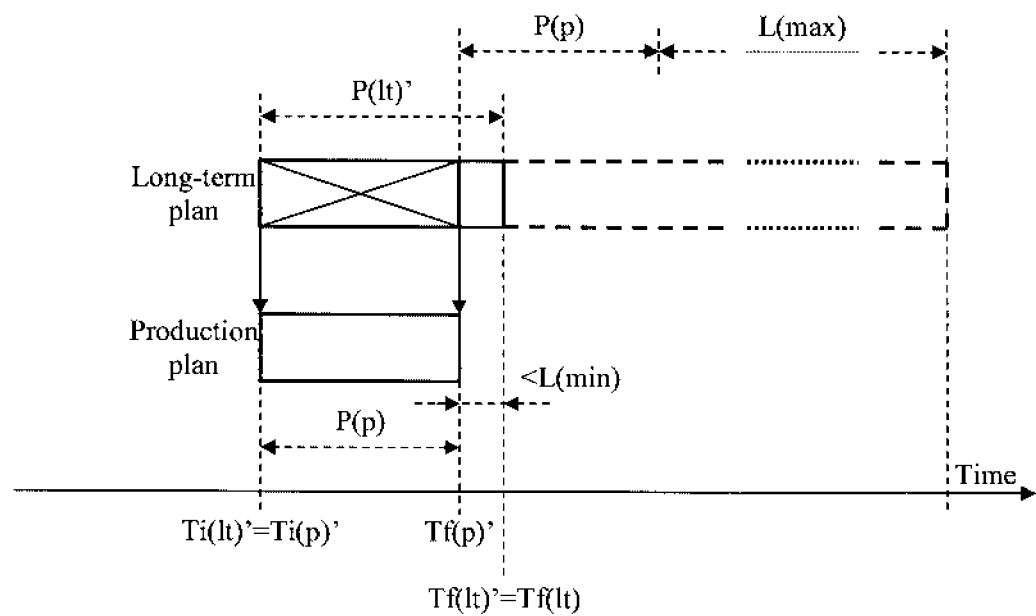

An example of application of this technique is shown in FIGS. 3a-3b. Considering in particular FIG. 3a, the long-term plan covers a long-term period P(lt), which spans from an initial time Ti(lt) to a final time Tf(lt), with P(lt)=Tf(lt)−Ti(lt). A new production plan must be generated for a production period P(p), which starts at an initial time Ti(p) (equal to the initial time Ti(lt) of the long-term plan in the example at issue) and then ends at a final time Tf(p)=Ti(p)+P(p). As shown in the figure, the final time Tf(p) of the new production plan precedes the final time Tf(lt) of the long-term plan; therefore, the new production plan may be generated by extracting and then expanding the corresponding portion of the long-term plan, i.e., from the initial time Ti(p) to the final time Tf(p). The remaining valid portion of the long-term plan (starting from the final time Tf(p) of the production plan just generated is compared with the required minimum length L(min), such as L(min)=P(p). In the situation shown in the figure, the long-term plan is still longer than this minimum length L(min), so that no action is required.

Moving to FIG. 3b, a further production plan must be generated at the end of the current production period P(p) for the next one, i.e., from an initial time Ti(p)'=Tf(p) to a final time Tf(p)'=Ti(p)'+P(p). The verification carried out after generating the previous production plan ensures that the final time Tf(p)' of the new production plan precedes the final time Tf(lt)'=Tf(lt) of the long-term plan; therefore, the new production plan can be generated by extracting and then expanding the corresponding portion of the long-term plan, from the initial time Ti(p)' to the final time Tf(p)'. However, the remaining valid portion of the long-term plan (starting from the final time Tf(p)' of the production plan just generated) is now shorter than the minimum length L(min). Therefore, the long-term plan is extended up to the allowable maximum length L(max), i.e., from Tf(p)' to Tf(p)'+L(max). This ensures that it will be possible again to generate the next production plan by extracting and expanding the corresponding portion of the long-term plan.

Figure 4A:
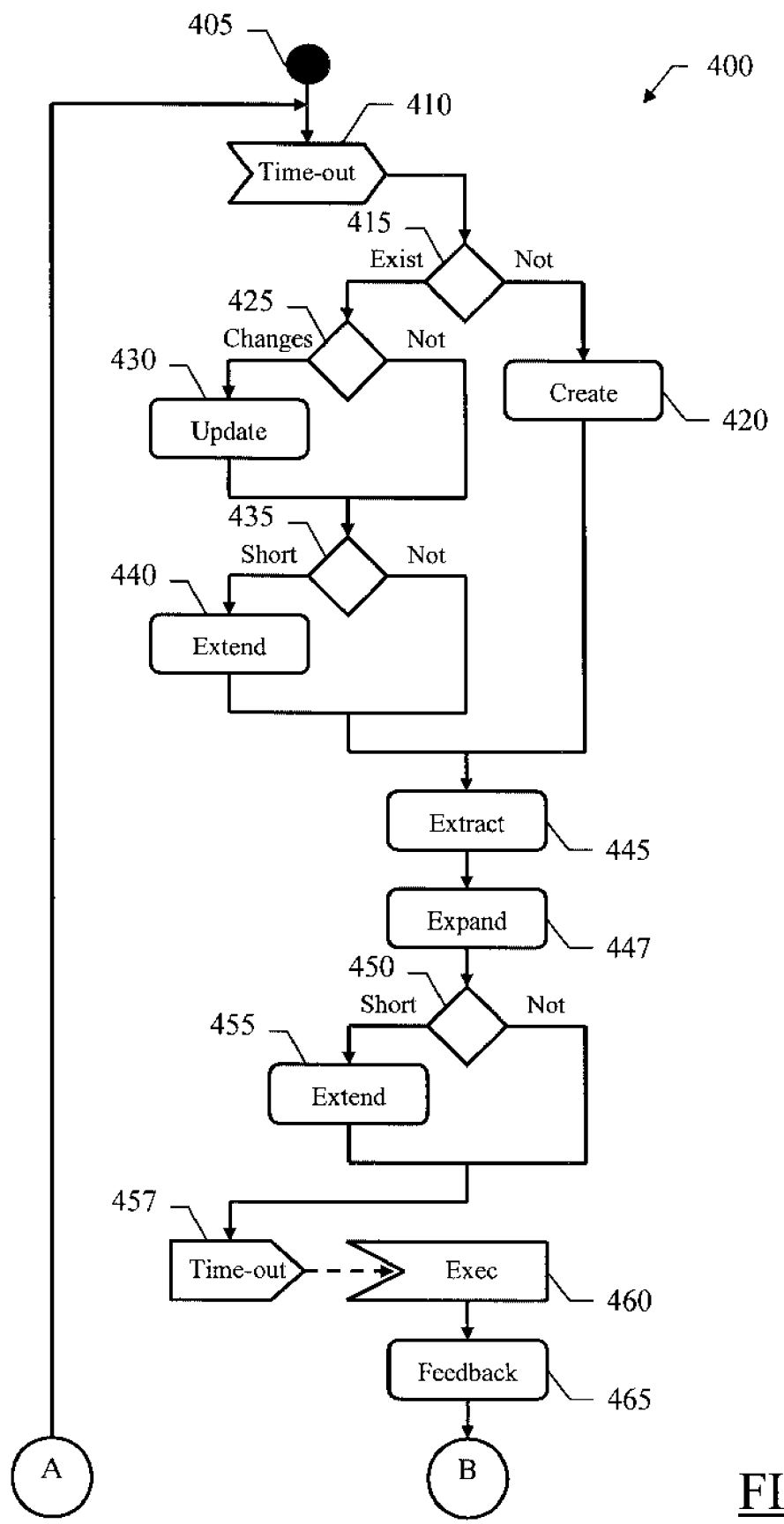
FIGS. 4a-4b show a diagram describing the flow of activities relating to an implementation of the solution according to an embodiment of the invention.
Figure 4B:
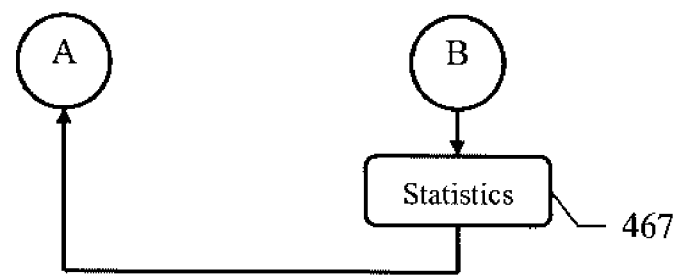
Figure 4B:
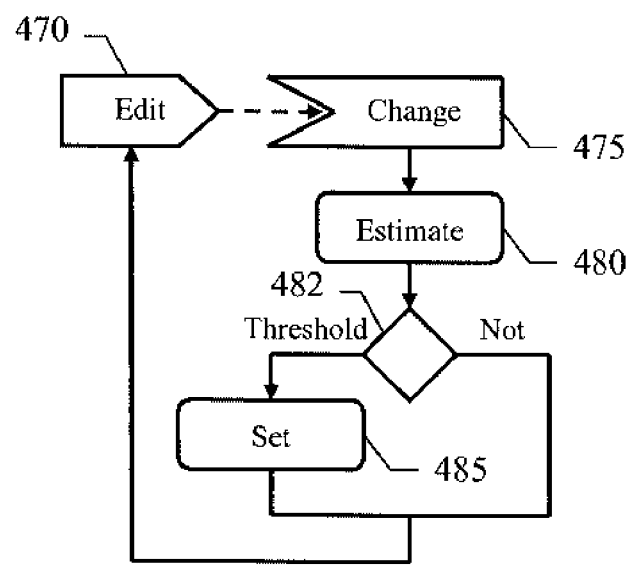

With reference now to FIGS. 4a-4b, the logic flow of an exemplary process that can be implemented in the above-described system (to schedule the execution of the jobs) is represented with a method 400. The method 400 begins at the black start circle 405. Continuing to block 410, a new production plan is created at the end of every production period (in response to the expiration of a corresponding time-out, for example, at 4:00).

First of all, the planner at block 415 verifies whether the long-term plan exists. If not, a new long-term plan is created at block 420; the long-term plan spans from the initial time of the new production plan to be generated up to its final time plus the allowed maximum length L(max). Conversely, a test is made at block 425 to verify whether any changes have been made to the external sequence dependencies for the streams (in the workload database) after the last iteration of the test. If so, the long-term plan is updated accordingly at block 430; particularly, the planner redefines the flow of execution of the instances of the streams affected by the changes, which instances have been inserted in the long-term plan after the same changes. This ensures that the long-term plan used to generate the production plan is always consistent with the last version of the workload database. The process then descends into block 435; the same point is also reached from block 425 directly when no changes have been made to the external sequence dependencies for the streams in the workload database.

Considering now block 435, the planner verifies whether the length of the long-term plan is shorter than the production period P(p). If so, the long-term plan cannot be used to generate the production plan; therefore, the long-term plan is extended at block 440 by the maximum length L(max) from the final time of the production plan to be generated.

In any case, the flow of activity merges at block 445 (from block 420, from block 435 when the long-term plan is longer than the production period P(p), or from block 440). In this phase, the planner extracts the portion of the long-term plan corresponding to the production period P(p) from the long-term plan (which portion is then invalidated in the long-term plan so as to reduce its effective length accordingly). This portion of the long-term plan is then expanded at block 447 into the actual production plan (replacing each instance of the streams with the corresponding jobs and ordering their execution according to the remaining dependencies).

Proceeding to block 450, the planner verifies whether the remaining portion of the long-term plan is shorter than the minimum length L(min) (such as L(min)=P(p)) If so, the length of the long-term plan would not be enough for the generation of the next production plan. Therefore, the long-term plan is extended at block 455 by the maximum length L(max) from the final time of the production plan just generated. The process then descends into block 457; the same point is also reached from block 450 directly when the length of the long-term plan is longer. In this way, it will be always possible to use the long-term plan to generate the next production plan (without any need to extend it); as a result, the response time of the planner is strongly increased. It should be noted that the idea of performing the extension of the long-term plan after each generation of the production plan moves the corresponding computational overload to a relatively dead period (as compared with the situation before the generation of the production plan).

Once the beginning of the new production period is reached (for example, at 6:00), the process passes from block 457 to block 460. In this phase, the handler starts the corresponding production plan; particularly, each job is submitted for execution as soon as possible (on an available workstation, typically selected by a load-balancing service of the scheduler). Once the job completes, the corresponding feedback information is returned at block 465 from the executor to the handler, which adds it to the production plan. At the end of the production period, the planner at block 467 updates the statistics information relating to the executed jobs in the workload database (according to the content of the production plan). The flow of activity then returns to block 410 to reiterate the same operations for a next production period.

In a completely asynchronous manner, the controller may edit the workload database at block 470. The entered changes are then saved at block 475. Any change to the external dependencies for the streams in the workload database is detected at block 480 by the analyzer, which recalculates the corresponding changing rate accordingly. Descending to block 482, the planner verifies whether the (estimated) changing rate has been updated significantly (for example, more than 5-10%). If so, the process continues to block 485, wherein the planner updates the maximum length L(max) of the long-term plan accordingly. The process then returns to block 470, waiting for a next change to the workload database; the same point is also reached from block 482 directly when the changing rate is substantially the same. In this way, the policy controlling the extension of the long-term plan self-adapts to the runtime conditions of the system automatically.

Naturally, in order to satisfy local and specific requirements, a person skilled in the art may apply to the solution described above many modifications and alterations. Particularly, although the present invention has been described with a certain degree of particularity with reference to preferred embodiments) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the system has a different architecture or includes equivalent units. Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like).

In any case, the invention has equal applicability to equivalent schedulers; for example, the scheduler may have another architecture, may work on a single computer, or may be used to control the execution of other work units (such as interactive tasks).

It should also be readily apparent that the numerical examples described above (for example, for the production period P(p), the run-cycles of the streams, and the like) are merely illustrative and must not be interpreted in a limitative manner.

Moreover, it is possible to set either the minimum length L(min) or the maximum length L(max) of the long-term plan to different values. For example, the minimum length L(min) may be equal to twice the production period P(p), or the maximum length L(max) may be equal to a predefined multiple thereof, such as 20-100 times the production period P(p); in any case, nothing prevents setting the minimum length L(min) and/or the maximum length L(max) even independently of the production period P(p) (for example, to some days and to some months, respectively).

However, even if in the preceding description great emphasis has been given to the extension of the long-term plan according to the minimum length L(min) and the maximum length L(max), the proposed solution is also suitable to be implemented with whatever policy relating to the long-term plan. For example, the policy may be defined by more complex conditions (such as depending on the period of the year); moreover, it is also possible to base the policy on other conditions (such as depending on the complexity of the production plan, on the workload of the system, and the like).

Alternatively, the long-term plan may be checked only before or only after the generation of the production plan. In any case, it is possible to monitor the compliance of the long-term plan with the corresponding policy in a different way, even independently of the generation of the production plan (for example, periodically).

Similar considerations apply if the planner detects different events involving any changes to the workload database affecting the long-term plan (according to its definition); for example, this happens when a time zone used to define the run-cycle of the streams is changed. Moreover, in this case as well the operation may be performed at any other time (such as immediately after the workload database has been changed).

Alternatively, the changing rate of the workload database may be estimated in a more sophisticated way (for example, by using fuzzy logic techniques), and/or the maximum length L(max) may be updated according to different algorithms (in response to any increase and/or decrease of the changing rate, with no limiting threshold). Moreover, nothing prevents customizing the maximum length L(max), or more generally any other aspect of the policy, manually. In any case, a basic implementation wherein the policy is defined statically is within the scope of the invention.

The concepts of the present invention may also be applied when the long-term plan is generated in another way, even without the definition of streams of jobs (for example, simply resolving the sequence dependencies of the jobs).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material, or with a combination of software and hardware.

The invention claimed is:

1. A method for scheduling execution of work units in a data processing system, the method including the steps of:
   generating a preliminary plan of execution of the work units for a long-term period,
   generating a production plan of execution of the work units for a production period included in the long-term period, the production plan being generated from a portion of the preliminary plan corresponding to the production period, and
   submitting the work units for execution according to the production plan, characterized by the steps of
   monitoring compliance of the preliminary plan with a predetermined policy, and
   updating the preliminary plan to comply with said predetermined policy by extending the preliminary plan at least to a minimum length, wherein the step of generating the production plan is performed periodically according to the production period, the step of updating the preliminary plan being performed after the step of generating the production plan.

2. The method according to claim 1, wherein the policy includes a the minimum length of the long-term period at least equal to the production period.

3. The method according to claim 2, wherein the policy includes a maximum length of the long-term period longer than the minimum length, the step of updating the preliminary plan including:
extending the preliminary plan according to the maximum length.

4. The method according to claim 1, wherein the preliminary plan is generated and updated according to rules defining execution dependencies of the work units, the method further including the steps of:
   monitoring for changes to external sequence dependencies of a job stream, and
   further updating the preliminary plan according to a frequency of the changes to the external sequence dependencies.

5. The method according to claim 4, wherein the step of generating the production plan is performed periodically according to the production period, the step of further updating the preliminary plan being performed before the step of generating the production plan.

6. The method according to claim 4, wherein the method further includes the steps of:
   estimating a changing rate of the rules, and
   setting the policy according to the changing rate.

7. The method according to claim 1, wherein the work units are logically organized in streams each one including a plurality of corresponding work units, the preliminary plan defining an execution flow of the streams, and wherein the step of generating the production plan includes:
   extracting the portion of the preliminary plan corresponding to the production period, and
   replacing each stream in the extracted portion with a definition of an execution flow of the corresponding work units.

8. A computer program stored in a computer readable storage medium for scheduling execution of work units in a data processing system for performing a method when the computer program is executed on a data processing system the method comprising the steps of:
   generating a preliminary plan of execution of the work units for a long-term period,
   generating a production plan of execution of the work units for a production period included in the long-term period, the production plan being generated from a portion of the preliminary plan corresponding to the production period,
   submitting the work units for execution according to the production plan,
   monitoring compliance of the preliminary plan with a predetermined policy, and
   updating the preliminary plan to comply with said predetermined policy by extending the preliminary plan at least to a minimum length, wherein the step of generating the production plan is performed periodically according to the production period, the step of updating the preliminary plan being performed after the step of generating the production plan.

9. The computer program according to claim 8, wherein the preliminary plan is generated and updated according to rules defining execution dependencies of the work units, the method further including the steps of:
   monitoring for changes to external sequence dependencies of a job stream, and
   further updating the preliminary plan according to a frequency of the changes to the external sequence dependencies.

10. The computer program according to claim 8, wherein the step of generating the production plan is performed periodically according to the production period, the step of further updating the preliminary plan being performed before the step of generating the production plan.

11. The computer program according to claim 8, wherein the work units are logically organized in streams each one including a plurality of corresponding work units, the preliminary plan defining an execution flow of the streams, and wherein the step of generating the production plan includes:
- extracting the portion of the preliminary plan corresponding to the production period, and
- replacing each stream in the extracted portion with a definition of an execution flow of the corresponding work units.

12. A system for scheduling execution of work units in a data processing system, the system comprising a data processor coupled to a memory that includes instructions that are operable by the data processor for performing steps of:
- generating a preliminary plan of execution of the work units for a long-term period,
- generating a production plan of execution of the work units for a production period included in the long-term period, the production plan being generated from a portion of the preliminary plan corresponding to the production period, and
- submitting the work units for execution according to the production plan,
- monitoring compliance of the preliminary plan with a predetermined policy, and
- updating the preliminary plan to comply with said predetermined policy by extending the preliminary plan at least to a minimum length, wherein the step of generating the production plan is performed periodically according to the production period, and the step of updating the preliminary plan being performed after the step of generating the production plan.

13. The system according to claim 12, wherein the policy includes the minimum length of the long-term period at least equal to the production period.

14. The system according to claim 13, wherein the policy includes a maximum length of the long-term period longer than the minimum length, the step of updating the preliminary plan including:
- extending the preliminary plan according to the maximum length.

15. The system according to claim 12, wherein the preliminary plan is generated and updated according to rules defining execution dependencies of the work units, the instructions are further operable for performing steps of:
- monitoring for changes to external sequence dependencies of a job stream, and
- further updating the preliminary plan according to a frequency of the changes to the external sequence dependencies.

16. The system according to claim 15, wherein the step of generating the production plan is performed periodically according to the production period, the step of further updating the preliminary plan being performed before the step of generating the production plan.

17. The system according to claim 15, wherein the instructions are further operable for performing steps of:
- estimating a changing rate of the rules, and
- setting the policy according to the changing rate.

18. The system according to claim 12, wherein the work units are logically organized in streams each one including a plurality of corresponding work units, the preliminary plan defining an execution flow of the streams, and wherein the step of generating the production plan includes:
- extracting the portion of the preliminary plan corresponding to the production period, and
- replacing each stream in the extracted portion with a definition of an execution flow of the corresponding work units.

* * * * *